United States Patent
Díaz Vico et al.

(10) Patent No.: US 11,514,170 B2
(45) Date of Patent: Nov. 29, 2022

(54) SECURE BOOT OF KERNEL MODULES

(71) Applicant: BANCO BILBAO VIZCAYA ARGENTARIA, S.A., Bilbao (ES)

(72) Inventors: Jesús Díaz Vico, Madrid (ES); Javier Moreno Molina, Madrid (ES)

(73) Assignee: Banco Bilbao Vizcaya Argentaria, S.A., Bilbao (ES)

( * ) Notice: Subject to any disclaimer, the term of this patent is extended or adjusted under 35 U.S.C. 154(b) by 305 days.

(21) Appl. No.: 16/648,411

(22) PCT Filed: Sep. 20, 2018

(86) PCT No.: PCT/EP2018/075447
§ 371 (c)(1),
(2) Date: Mar. 18, 2020

(87) PCT Pub. No.: WO2019/057810
PCT Pub. Date: Mar. 28, 2019

(65) Prior Publication Data
US 2020/0265141 A1  Aug. 20, 2020

(30) Foreign Application Priority Data
Sep. 22, 2017 (EP) ..................... 17382635

(51) Int. Cl.
*G06F 15/177* (2006.01)
*G06F 9/00* (2006.01)
(Continued)

(52) U.S. Cl.
CPC .............. *G06F 21/575* (2013.01); *G06F 8/65* (2013.01); *G06F 21/572* (2013.01);
(Continued)

(58) Field of Classification Search
CPC ........ G06F 21/575; G06F 8/65; G06F 21/572; G06F 2221/034; G06F 21/44;
(Continued)

(56) References Cited

U.S. PATENT DOCUMENTS

| | | | | |
|---|---|---|---|---|
| 6,108,783 A | * | 8/2000 | Krawczyk | H04L 9/3236 713/180 |
| 2011/0126020 A1 | * | 5/2011 | Isshiki | H04N 21/6125 713/176 |

(Continued)

FOREIGN PATENT DOCUMENTS

| | | |
|---|---|---|
| EP | 2 157 725 A1 | 2/2010 |
| EP | 2 867 813 A1 | 5/2015 |
| WO | WO 2014/004404 A1 | 1/2014 |

OTHER PUBLICATIONS

Alsouri et al; Group-Based Attestation: Enhancing Privacy and Management in Remote Attestation; Jun. 21, 2010; 15 pages.

(Continued)

*Primary Examiner* — Xuxing Chen
(74) *Attorney, Agent, or Firm* — Knobbe, Martens, Olson & Bear, LLP

(57) ABSTRACT

A computer-implemented method for providing a secured updated kernel module of an electronic device, wherein the method comprises the following steps: inserting by a computer a chameleon hash of a kernel module, a kernel module private key of the kernel module and an updated kernel module of the kernel module in a chameleon hash collision function thereby obtaining a collision data, combining by the computer, the updated kernel module with the collision data obtaining thereby a secured updated kernel module. Additionally, it is further described a computer-implemented method for secure updating at least one kernel module of an (Continued)

electronic device, a system comprising a server and an electronic device, computer programs and a computer-readable medium.

11 Claims, 10 Drawing Sheets

(51) Int. Cl.
*G06F 21/57* (2013.01)
*G06F 8/65* (2018.01)
*H04L 9/08* (2006.01)
*H04L 9/14* (2006.01)
*H04L 9/30* (2006.01)
*H04L 9/32* (2006.01)

(52) U.S. Cl.
CPC .......... *H04L 9/0836* (2013.01); *H04L 9/0891* (2013.01); *H04L 9/14* (2013.01); *H04L 9/3073* (2013.01); *H04L 9/3242* (2013.01); *H04L 9/3247* (2013.01); *G06F 2221/034* (2013.01)

(58) Field of Classification Search
CPC ....... H04L 9/0836; H04L 9/0891; H04L 9/14; H04L 9/3073; H04L 9/3242; H04L 9/3247; H04L 2209/38; H04L 9/3236
See application file for complete search history.

(56) References Cited

U.S. PATENT DOCUMENTS

| | | | |
|---|---|---|---|
| 2011/0131447 A1 | 6/2011 | Prakash et al. | |
| 2014/0365026 A1 | 12/2014 | Yuichi et al. | |
| 2015/0261521 A1* | 9/2015 | Choi | H04L 9/3236 |
| | | | 713/176 |
| 2017/0374033 A1* | 12/2017 | Kovacs | H04L 9/3263 |

OTHER PUBLICATIONS

Schmidt et al; Tree-formed Verification Data for Trusted Platforms; Jul. 5, 2010, 11 pages.
Ateniese et al; On the Key Exposure Problem in Chameleon Hashes; Sep. 21, 2004; 16 pages.
IPRP; PCT/EP2018/075447; dated Dec. 5, 2019; 35 pages.
EESR; EP 17382635.5, dated Nov. 9, 2017, 10 pages.

* cited by examiner

SECURE BOOT OF KERNEL MODULES

TECHNICAL FIELD OF THE INVENTION

The present invention belongs to the technical field of kernel modules updating in a kernel of an Operating System. Particularly, it is related to authenticated delegation of kernel module updates. More particularly, the invention relates to a method for providing a secured updated kernel module where trusted third parties may secure update said kernel module without the intervention of the kernel developer.

BACKGROUND OF THE INVENTION

Current electronic devices implement secure boot processes for ensuring that the state of the device, upon boot up, can be trusted. This includes verifying the boot stub, firmware modules and kernel modules through cryptographic mechanisms.

Normally, the electronic device has a root public key written in a read only area of the memory. This root public key is used to verify signatures of the firmware modules installed in the electronic device, which in turn include the public part of an additional key, the kernel private key that is used to sign the kernel. The resulting signatures are written in the read-write part of the memory of the electronic device.

The private key associated to the root public key is usually controlled by the Original Equipment Manufacturer, OEM, or device vendor and the private key used to sign the kernel is controlled by the firmware developer, who may or may not be the same entity as the OEM or device vendor. Thus, during secure boot, verifying that the kernel and firmware signatures are correct is sufficient to check that the firmware and kernel components of the device have not been tampered with.

In this context, any modification made to the kernel needs to be signed with the kernel private key. Specifically, kernel modules provide enhanced functionalities to the device, which are many times developed by third parties, also need to adhere to this requirement. This process forces these third parties to strictly follow the development cycle of the kernel developer, being unable to issue updates of their respective modules when needed, even if these updates fix important security issues.

"Group-Based Attestation: Enhancing Privacy and Management in Remote Attestation" discloses an attestation method using a remote platform. European patent application EP 2157725 A1 discloses a Content protection apparatus, and content utilization apparatus. "Tree-formed Verification Data for Trusted Platforms" discloses a method to create a tree-formed verification data. US patent application US 2014/0365026 A1 discloses a signature generating apparatus and method.

Document US 20110131447 A1 discloses a method for automatically updating firmware without the intervention of the user of the electronic device. As the only party which is allowed to update the firmware is the kernel developer, any update, which has been performed by any third party, should be sent to the kernel developer. Therefore, it is still required the intervention of the kernel developer in order to provide a secure firmware, which delays any fix important security updates.

Therefore, there is a need of a method which increases the efficiency and the agility of updating the kernel modules in an electronic device.

SUMMARY OF THE INVENTION

The present invention provides an alternative solution for the aforementioned problems, by a computer-implemented method for secure updating at least one kernel module of an electronic device according to claim 1, a system for secure updating at least one kernel module according to claim 9, a computer program according to claim 10 and a computer-readable medium according to claim 11. In dependent claims, preferred embodiments of the invention are defined.

In a first inventive aspect, the invention provides a computer-implemented method for providing a secured updated kernel module of an electronic device, wherein the electronic device comprises an operating system and an authenticated kernel structure, the authenticated kernel structure comprising kernel metadata comprising
   at least one kernel module public key of at least one kernel module, wherein each kernel module public key corresponds to a kernel module private key, being the corresponding kernel module public and private keys a kernel module pair of keys, and
   a kernel module root hash comprising a root hash of a Merkle tree,
kernel data comprising
   kernel body data,
   at least one kernel module, wherein a kernel module is associated to one kernel module pair of keys,
kernel metadata signature,
kernel body data signature,
wherein the method comprises the following steps:
   i) inserting by a computer a chameleon hash of a kernel module, a kernel module private key of the kernel module and an updated kernel module of the kernel module in a chameleon hash collision function thereby obtaining a collision data,
      wherein the collision data is such that when the collision data is combined with the updated kernel module and said combination is hashed using a chameleon hash function, the result is equal to the chameleon hash of the kernel module,
   ii) combining by the computer, the updated kernel module with the collision data obtaining thereby a secured updated kernel module.

The authenticated kernel structure is a kernel structure which comprises instructions which allows operating the hardware and software elements of an electronic device. Depending on the type of electronic device, the number of kernel modules may vary and in consequence the number of kernel module public keys may also vary. The kernel structure is authenticated when the source of its elements has been verified.

Throughout this document, "electronic device" will be understood as any device configured to operate an operating system such as a mobile device, a computer, server, smartphone, tablet, PDA, etc. The electronic device comprises an operating system which is configured to manage the hardware comprised in the electronic device and to manage the data used by said hardware. Additionally, the kernel module will be understood as a computer program configured to control hardware functionalities of an electronic device.

As any computer program the kernel module may have further updates or versions. Thus, throughout this document, "updated kernel module" will be understood as a new version of a previous version of a kernel module.

The kernel metadata comprises a public key which is related to at least one computer. The computer may be a third party which develops firmware or updates the kernel module. The computer may be additionally a server or a second electronic device wherein the new version of the kernel module is stored and/or updated and further comprises and its correspondence private key. The at least one computer is a different element from the kernel developer and the original equipment manufacturer.

Each kernel module public key is related with each kernel module comprised in the kernel data. For example, the screen kernel module controls the functions of the screen of the electronic device and it is related to only one kernel module public key, i.e., to a screen kernel module public key. Each kernel module public key has a correspondent kernel module private key which, in turn, is related to the computer, known as kernel module pair of keys forming an asymmetric cryptosystem. As an asymmetric cryptosystem, it should be understood a cryptosystem where the private key is kept private by the computer and the public key is public and can be stored in the authenticated kernel structure.

In one embodiment, the kernel metadata comprises a plurality of kernel module public keys and the kernel module public keys may be referred to only one computer. In this embodiment, the computer is configured to store and/or update the kernel modules which are related to the kernel module public keys, and the computer has the kernel module pair of keys correspondent to said kernel module. In other embodiment, there is a plurality of computer which each computer may comprise a plurality of kernel module private keys. As each kernel module private/public key is related to one kernel module, each computer is configured to store and/or update the kernel modules which are related to the kernel module public keys.

In one embodiment, the computer comprises the kernel module, its updated kernel module, the chameleon hash of the kernel module and the kernel module private key, wherein as updated kernel module it should be understood as a new version of the kernel module. In this embodiment, the computer is the same entity which produces the new version of the kernel module, i.e., the computer is developer of the kernel module. In this case, the computer normally comprises every version which has been developed and also it is able to compute any chameleon hash because it has been received the pair of kernel module keys from the kernel developer or the OEM. In other embodiment, the computer generates the pair of kernel module keys which are accepted by the kernel developer or the OEM.

In other embodiment, the computer-implemented method comprises a previous step before step i) of receiving a kernel module, its updated kernel module, the chameleon hash of the kernel module and the private key of the kernel module.

The kernel module root hash is a root hash of a Merkle tree. Additionally, the kernel module root hash is obtained from the kernel data; as a consequence, any illegitimate modification of the kernel module will be detected, as it will make the kernel signature invalid due to the properties of cryptographic hash functions and the construction of a Merkle tree. Therefore each the chameleon hash is a leaf node of the Merkle tree.

Firstly, the computer-implemented method inserts in a chameleon hash collision function the updated kernel module, the chameleon hash of the previous version of the kernel module and the kernel module private key correspondent to said kernel module. The updated kernel module is a new version of the kernel module of the kernel data. The new version may fix security bugs or may enhance a certain function of the electronic device.

The chameleon hash collision function is configured to find a collision data. In the context of the invention, a cryptographic hash is a cryptographic function which deterministically transforms data of arbitrary length into random messages of fixed length. Cryptographic hash functions are one way, i.e., it is computationally intractable to recover the parameter used in an execution of the hash function when only given the result of applying the hash function over that parameter. It is also computationally intractable to find two different parameters that produce the same result. A collision data is when two or more different data are used as inputs to a cryptographic hash function, produce the same hashed result.

In a chameleon hash system, each entity has a public and private key pair. As entity it should be understood, any computer or party involved in the process of updating a kernel module. A chameleon hash is always associated to a kernel module pair of keys. Given a public key, anyone can compute a chameleon hash that can be verified to be valid under that public key. The owner of the corresponding private key can compute arbitrary collisions for any hash that has been computed with his public key, independently on whether or not he has been the one actually computing the hash.

Advantageously, due to the chameleon hash properties a cryptographic hash function is associated to a public-private key pair. Any entity with access to the public key can issue and verify chameleon hashes. Only the owner of the private key can find arbitrary collisions of a message, given a chameleon hash of the message under that private key.

Thus, when the computer inserts the updated module kernel data, the chameleon hash of the received kernel module, and the private key correspondent to the module data in a chameleon Hash collision function, the chameleon Hash collision function calculates a collision data. When, the collision data is combined with the updated module kernel data and said combination is hashed using a chameleon hash function, the result is equal to the chameleon hash of the kernel module, i.e., a chameleon hash which is correspondent to the result of hashing the kernel module and the correspondent kernel module public key using said chameleon hash function. Thus, two different data, the updated module kernel data and the module kernel data, produce the same hashed result. Due to this, the kernel and firmware signatures do not change and the kernel module can be installed without any intervention of the kernel developer.

Finally, the collision data is combined with the updated module kernel data obtaining a secured updated kernel module. The combination in step ii) provides an element, the secured updated kernel module, which comprises the new version of the kernel module and the collision data. In one embodiment, the combination is performed by merging the updated module kernel data and the collision data, according to the collision finding algorithm defined by the Chameleon Hash system.

The present invention avoids the intervention of the kernel developer maintaining the security of the updating process of the kernel modules.

Advantageously, legitimate third party firmware development companies, i.e., the computer of the method, can follow their own processes for updating their firmware modules in the electronic devices. This can result in a more agile process that makes available the most recent versions of each firmware module at a much faster pace. This is relevant from a security perspective, as these updates many times fix important security bugs. Also, the method reduces the overload of the Original Equipment Manufacturer, who can securely and modularly delegate these tasks. Moreover, the Original Equipment Manufacturer can revoke these capabilities at any moment if it considers that a third party, while being authorized, is not applying processes that meet the Original Equipment Manufacturer's requirements by deleting the public key of said third party from the authenticated kernel structure.

It is clear from the above paragraph that the steps i) and ii) of method of the invention are performed exclusively internally in the electronic device, i.e., are performed offline without performing any communication outside said device.

In a particular embodiment, the chameleon hash collision function comprises a key-exposure free chameleon hash function.

In a particular embodiment, the computer comprises one kernel module pair of keys.

In a second inventive aspect, the invention provides a computer-implemented method for secure updating at least one kernel module of an electronic device, wherein the electronic device comprises an operating system and an authenticated kernel structure. The authenticated kernel structure comprises the same elements described in the first inventive aspect.

The computer-implemented method for secure updating at least one kernel module of the electronic device comprising the following steps,
 a) providing by a computer a secured updated kernel module generated according to the computer-implemented method of any of the embodiments of the first aspect of the invention,
 b) sending by the computer the secured updated kernel module to the electronic device,
 c) installing by the electronic device the secured updated kernel module in the kernel data updating the kernel module.

The secured updated kernel module is provided according to the computer-implemented method of any of the embodiments of the first aspect of the invention. Due to the properties of the chameleon collision function used and the collision data comprised in the secured updated kernel module, the installation of the secured updated kernel module will not change the kernel module root hash. Advantageously, the updating rate of the kernel data is enhanced increasing the security of the kernel structure because any security bug is quickly fixed. As it indicated above, each the chameleon hash is a leaf node of the Merkle tree.

In a particular embodiment, in a previous step before step a), the method comprises the following steps:
 generating by the computer at least one kernel module pair of keys,
 sending by the computer the at least one kernel module public key to the electronic device,
 sending by the computer the at least one kernel module private key to at least one external entity, and,
 receiving and storing by the at least one external entity, the at least one kernel module private key,
 receiving and storing by the electronic device, the at least one kernel module public key.

Advantageously, this embodiment allows the computer to delegate to other external entities the capability of providing secure updates to the electronic device, reducing the overload of the Original Equipment Manufacturer.

In a particular embodiment, in a previous step before step a), the method comprises the following steps:
 generating by an external entity at least one kernel module pair of keys,
 sending by the external entity the at least one kernel module public key to the electronic device,
 sending by the external entity the at least one kernel module private key to the computer, and
 receiving and storing by the computer, the at least one kernel module public key,
 receiving and storing by the computer, the at least one kernel module private key.

Advantageously, these embodiments allow delegate the assignment of trusted external entities to the trusted elements who are allowed to update at least one kernel module. In one embodiment, the trusted element is the computer, which has the kernel module private key correspondent to the kernel module public key. In other embodiment, the trusted element is an external entity such as the kernel developer or the Original Equipment Manufacturer. Thus, in a critical situation, i.e., when a security bug must be fixed, the trusted element is able to delegate or distribute the task to another external entities increasing capability of fixing said security bug, reducing the response time, and as a consequence, the security of the kernel data increase.

In a particular embodiment, any sending between computer and the electronic device is performed though a telecommunication network (TN), and wherein any sending is ciphered, preferably using transport layer security, TLS. As any sending it should be understood any step of the previous embodiments which involves the sending of data between any entity, such as, the computer, the external entity or the electronic device. Advantageously, this embodiment increases the security of method of the invention.

In a particular embodiment, the kernel module root Hash is computed in the electronic device, the kernel module root Hash is computed performing the following steps:
 inserting each kernel module and its correspondent kernel module public key in the chameleon hash function obtaining chameleon hash for each kernel module,
 hashing each obtained chameleon hashes in pairs obtaining a hash for each hashing,
 hashing the hashes between them until obtaining the kernel module root hash.

Advantageously, the generation of the kernel module root Hash is computed in the electronic device increasing the security of the kernel data.

In one embodiment, the method further comprising the following steps between steps b) and c),
 inserting by the electronic device the secured updated kernel module, the corresponding kernel module public key and a chameleon hash of the kernel module in a chameleon hash verification function thereby obtaining a test hash,
 if the test hash is different from the chameleon hash of the kernel module, notifying to the operating system of the electronic device that the secure updating a kernel module is invalid,
 if the test hash is equal to the chameleon hash of the kernel module, notifying to the operating system of the electronic device that the secure updating a kernel module is valid and continue the step c).

Advantageously, this method allows checking if any received secured updated kernel module is tampered or valid.

In one embodiment, if the test hash is different than the corresponding chameleon hash, the method further comprises deleting the secured updated kernel module. Advantageously, this embodiment provides a further action when it has been detected that the secured kernel module has been tampered, avoiding further security risks and increasing the security of the kernel data.

The above two previous embodiments of the second inventive aspect are performed exclusively internally in the electronic device, i.e., are performed offline without performing any communication outside said electronic device. Thus, the above two embodiments can be considered as a computer-implemented method for securely updating and securely and exclusively internally verifying at least one secured updated kernel module of an electronic device. Advantageously, said embodiments avoids the emission of new digital signatures from the OEM or kernel developer, allowing a verification process to be offline and without requiring special hardware nor online connectivity, which could be crucial to make more agile the update process, for instance, to solve a security bug.

Additionally, the chameleon hashes of the kernel module are leaf nodes of the Merkle tree so they are able to find collisions enabling maintaining a fixed root hash that can be used to uniquely represent all the kernel modules. This allows reducing the amount of memory employed in the verification process, which advantageously allows implementing this solution in electronic devices with limited read only memories or ROM.

In a third inventive aspect, the invention provides system for secure updating at least one kernel module comprising
a server configured to perform the method steps of the method according to any of the embodiments of the second aspect of the invention when they are referred to the computer,
a electronic device in communication to the server through a telecommunications network (TN) configured to perform any of the method steps according any of the embodiments of the second aspect of the invention when they are referred to the electronic device.

In a fourth inventive aspect, the invention provides a computer program for providing a secured updated kernel module of an electronic device, comprising instructions which, when the program is executed by a computer, cause the computer to carry out the steps of the computer-implemented method of any of the embodiments of the first aspect of the invention.

In a fifth inventive aspect, the invention provides a computer program for secure updating at least one kernel module of an electronic device, comprising instructions which, when the program is executed by a computer and an electronic device, cause the computer and the electronic device to carry out the steps of the computer-implemented method of any of the embodiments of the second aspect of the invention.

In a sixth inventive aspect, the invention provides a computer-readable medium,
comprising instructions which, when executed by a computer, cause the computer to carry out the steps of the method of any of the embodiments of the first aspect of the invention, and/or
comprising instructions which, when executed by a computer and an electronic device, cause the computer and the electronic device to carry out the steps of the method of any of the embodiments of the second aspect of the invention.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

FIGS. 1, 4, 4a, 4b, 5, 6a to 6d describe embodiments of the present invention. In particular, in FIG. 1 it is described an embodiment of the computer-implemented method (101) for providing a secured updated kernel module (3.4") of an electronic device (200).

Figure 2:
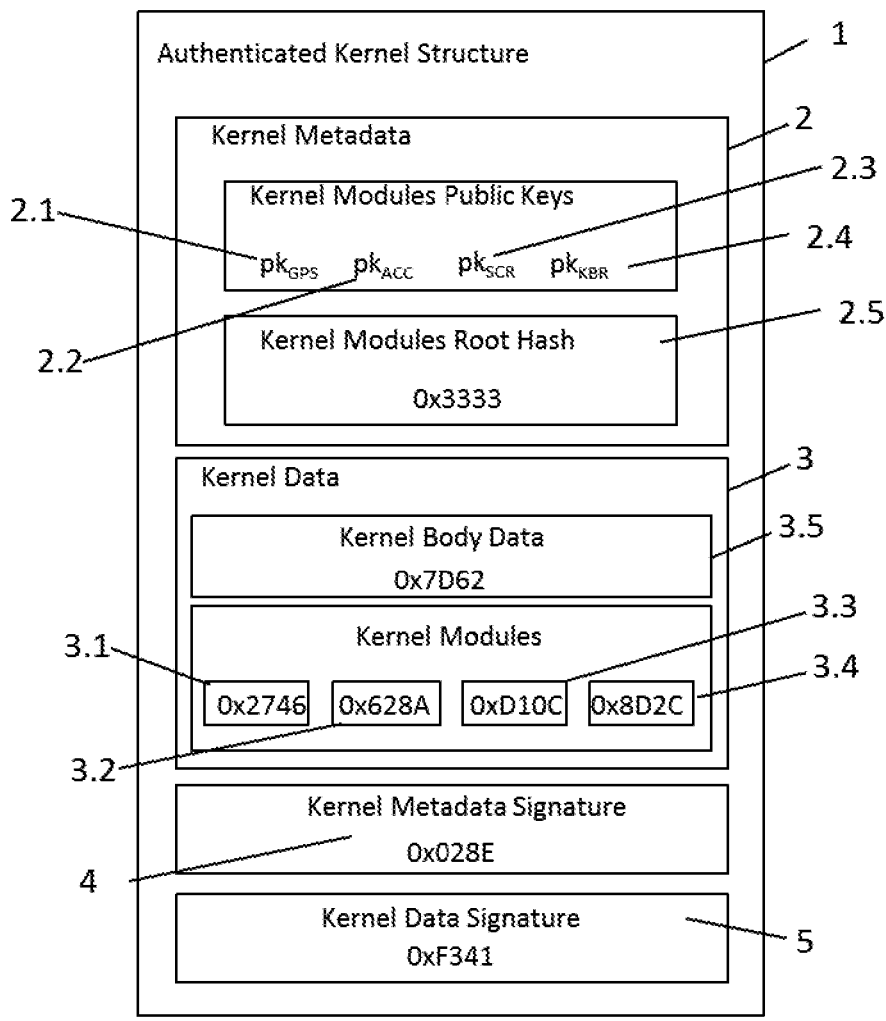
FIG. 2 This figure shows an embodiment of an authenticated kernel structure of an electronic device used in the method of the invention.

The electronic device (200) comprises an operating system and an authenticated kernel structure (1). FIG. 2 shows an embodiment of the authenticated kernel structure (1). In this embodiment, the electronic device (200) is a smartphone and the authenticated kernel structure (1) comprises kernel metadata (2), kernel data (3), kernel metadata signature (4) and kernel data signature (5). The hexadecimal value of the kernel metadata signature (4) and kernel data signature (5) are "0x028E" and "0xF341" respectively.

In this embodiment, the electronic device (200) comprises four hardware elements controlled by the corresponding modules written in the kernel data (3). In particular, the hardware elements are global position system or GPS, accelerometer, screen and keyboard.

The kernel metadata (2) comprises four kernel module public keys "pk" (2.1, 2.2, 2.3, 2.4) and a kernel module root hash (2.5). The kernel module public keys (2.1, 2.2, 2.3, 2.4) corresponds to each hardware element controlled by the kernel data (3). In this embodiment, the four kernel module public keys are a kernel module public key for the GPS (2.1, $pk_{GPS}$), kernel module public key for the accelerometer (2.2, $pk_{ACC}$), kernel module public key for the screen (2.3, $pk_{SCR}$) and kernel module public key for the keyboard (2.4, $pk_{KBR}$). Additionally, the hexadecimal value of the kernel module root hash (2.5) is "0x3333".

The kernel data (3) comprises the computer programs configured to control hardware functionalities of the electronic device (200). In particular, the kernel data (3) comprises a kernel body data (3.5) which its hexadecimal value is "0x7D62". The kernel body data (3.5) includes the modules signed by the manufacturer and the totality of the functionality supported by the manufacturer, the operating system and the non-outsourced drivers. Additionally, the kernel data (3) comprises four kernel modules data which corresponds to the each hardware element of the electronic device (200). In this embodiment, the four kernel modules data keys are:

The kernel module for the GPS (3.1) or GPS kernel module, wherein its hexadecimal value is "0x2746".

The kernel module for the accelerometer (3.2) or accelerometer kernel module, wherein its hexadecimal value is "0x628A".

The kernel module for the screen (3.3) or screen kernel module, wherein its hexadecimal value is "0x628A".

The kernel module for the keyboard (3.4) or keyboard kernel module, wherein its hexadecimal value is "0x8D2C".

Figure 1:
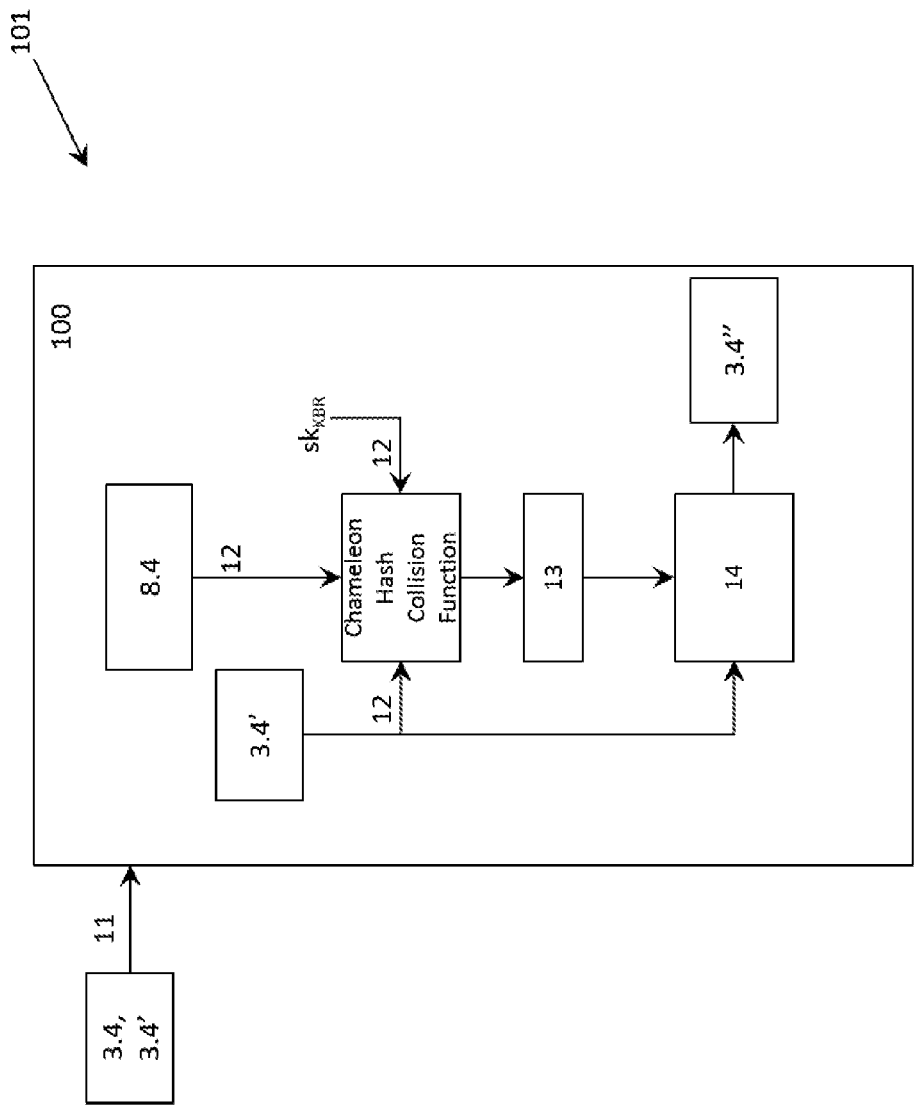
FIG. 1 This figure shows an embodiment of the computer-implemented method for providing a secured updated kernel module of an electronic device.

Method for Providing a Secured Updated Kernel Module of an Electronic Device (200) (FIG. 1).

In this embodiment, the kernel module to be updated is the keyboard kernel module (3.4). In this embodiment, the computer (100) firstly receives (11) the keyboard kernel module (3.4) and the new version of the keyboard kernel module (3.4), i.e., the updated keyboard kernel module (3.4') and the private key of the kernel module ($sk_{KBR}$). In other embodiments, the computer (100) comprises said received elements.

Secondly, a collision data (13) is calculated by inserting in a chameleon hash collision function, the updated keyboard kernel module (3.4'), a chameleon hash (8.4) of the keyboard kernel module (3.4) and the kernel module private key of the keyboard (2.4) ($sk_{KBR}$). Finally, the collision data (13) is combined (14) with the updated keyboard kernel module (3.4') obtaining thereby a secured updated kernel module (3.4").

Figure 3:
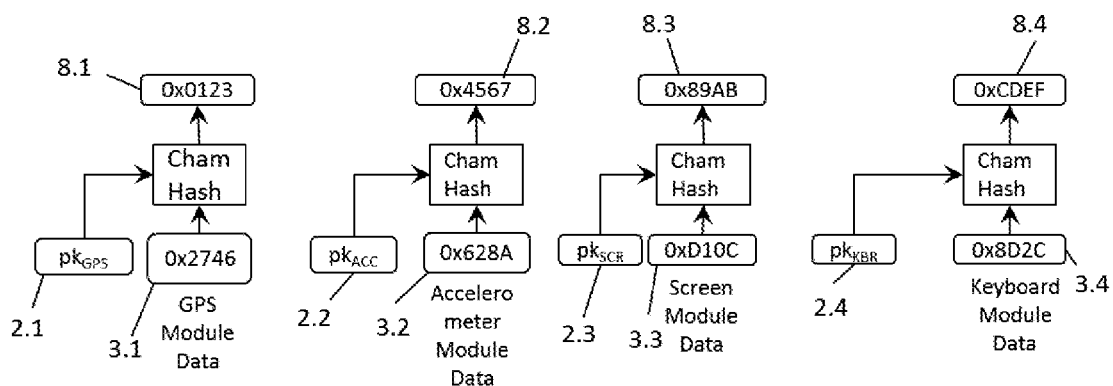
FIG. 3 This figure shows an embodiment of the calculation of the chameleon hash of four kernel modules comprised on an authenticated kernel structure.

In FIG. 3 it is shown an embodiment of the calculation of all chameleon hashes (8.1, 8.2, 8.3, 8.4) of all kernel modules data (3.1, 3.2, 3.3, 3.4). The chameleon hashes (8.1, 8.2, 8.3, 8.4) are calculated by inserting a kernel module (3.1, 3.2, 3.3, 3.4) and its correspondence kernel module public key (2.1, 2.2, 2.3, 2.4) in chameleon hash function (ChamHash). In this figure, the hexadecimal value of the chameleon hash (8.1) of the GPS kernel module (3.1) is "0x0123", the hexadecimal value of the chameleon hash (8.2) of the accelerometer kernel module (3.2) is "0x4567", the hexadecimal value of the chameleon hash (8.3) of the screen kernel module (3.3) is "0x89AB" and the hexadecimal value of the chameleon hash (8.4) of the keyboard kernel module (3.4) is "0xCDEF". In one embodiment, this calculation can be performed in the electronic device (200).

In the embodiment of FIG. 1, the computer (100) is only allowed to provide updates of the keyboard kernel module (3.4), thus the computer (100) has only received the keyboard kernel module private key ($sk_{KBR}$). As the collision data (13) has been calculated with the keyboard kernel module private key ($sk_{KBR}$) and the chameleon hash (8.4) of the keyboard kernel module (3.4), the secured updated kernel module (3.4") will provide same chameleon hash (8.4) "0XCDEF" only if it is calculated as with the chameleon hash function (ChamHash) and the keyboard kernel module public key (2.4) ($pk_{KBR}$).

Figure 4:
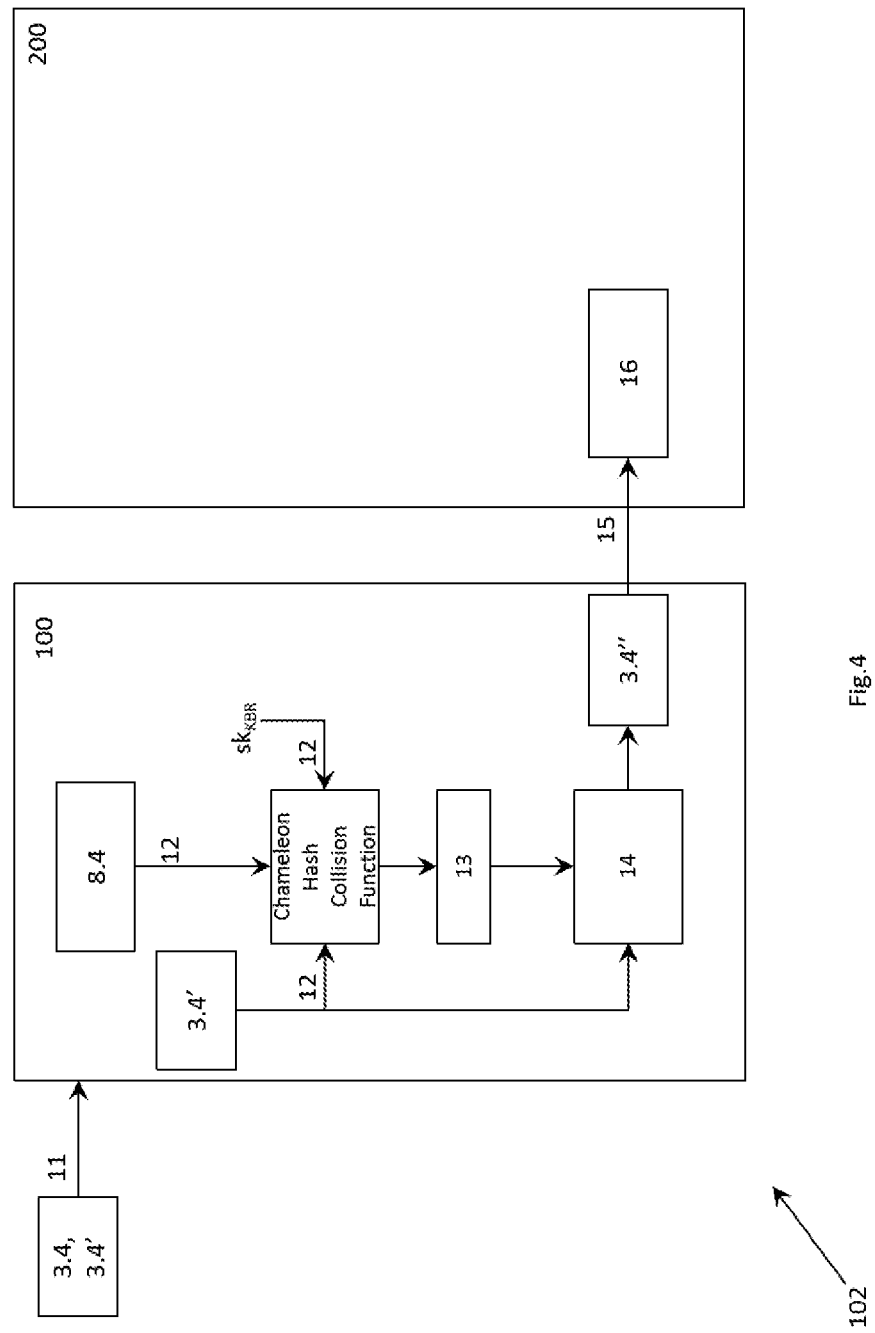
FIGS. 4, 4a and 4b These figures show an embodiment computer-implemented method for secure updating of at least one secure updated kernel module of an electronic device.
Figure 4A:
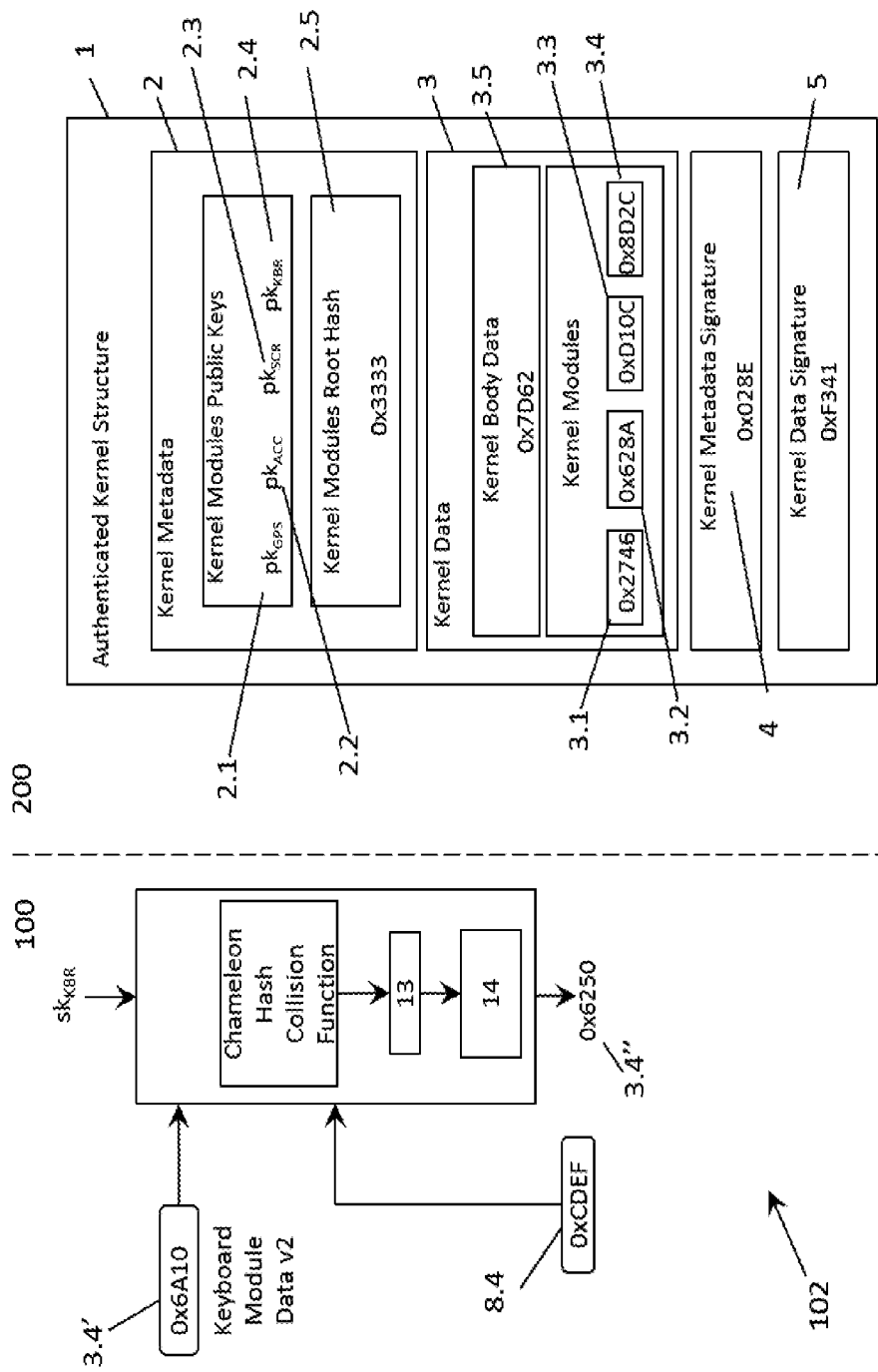
Figure 4B:
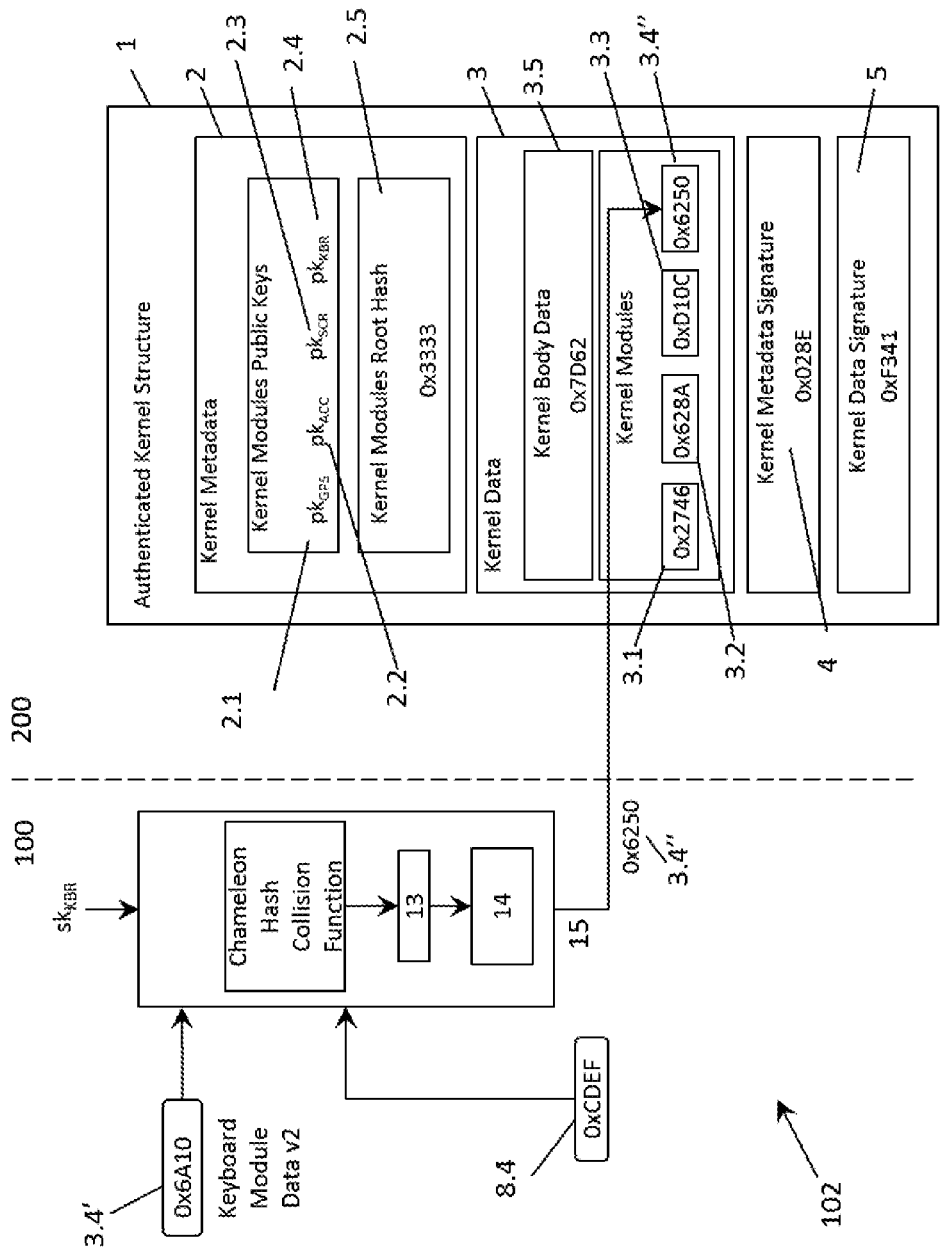

Method (102) for Secure Updating of at Least One Kernel Module of an Electronic Device (200) (FIGS. 4, 4a, 4b).

FIGS. 4, 4a and 4b show an embodiment of the computer-implemented method (102) secure updating of at least one secured updated kernel module (3.4") of an electronic device (200). In this embodiment, the secured updated kernel module (3.4") corresponds to a new version of the keyboard kernel module (3.4).

Firstly, the secured updated keyboard kernel module (3.4") is provided as it is disclosed in the embodiment of FIG. 1. As it can be appreciated the left part of FIG. 4 is similar to the embodiment of the FIG. 1. Once the secured updated keyboard kernel module (3.4") is provided, the computer (100) sends (15) to the electronic device (200) the secured updated keyboard kernel module (3.4"). Finally, once the electronic device (200) receives the secured updated keyboard kernel module (3.4"), the electronic device (200) installs the secured updated keyboard kernel module (3.4") in the authenticated kernel structure (1).

FIGS. 4a and 4b show a detailed process of the method for updating the secured updated keyboard kernel module (3.4"). In FIG. 4a, it can be appreciated that the previous version of the keyboard kernel module (3.4) has a hexadecimal value of "0x8D2C" and how is provided the new version of the secured updated keyboard kernel module (3.4"). As it is explained in the embodiment of the FIG. 1, the updated kernel module (3.4'), which has a hexadecimal value of "0x6A10", the chameleon hash of the previous version of the keyboard kernel module (3.4), which has a hexadecimal value of "0xCDEF", and the keyboard kernel module private key ($sk_{KBR}$) are inserted (12) to the Chameleon Hash Collision Function obtaining a collision data (13). Then, the collision data (13) is combined (14) with the updated kernel module (3.4') obtaining the secured updated keyboard kernel module (3.4"), which has a hexadecimal value of "0x6250".

In FIG. 4b, it can be appreciated how the computer (100) sends (15) the secured updated keyboard kernel module (3.4") to the electronic device (200) and how the secured updated keyboard kernel module (3.4") is installed in the authenticated kernel structure (1). Now, the new hexadecimal values of the kernel modules are:

0x2746 for the first version of the GPS kernel module (3.1),

0x628A for the first version of the accelerometer kernel module (3.2),

0xD10C for the first version of the screen kernel module (3.3), and

0x6250 for the second version of the keyboard kernel module (3.4").

First Embodiment: Verifying a Secured Updated Kernel Module (3.4') of the Electronic Device (200) (FIG. 5)

Figure 5:
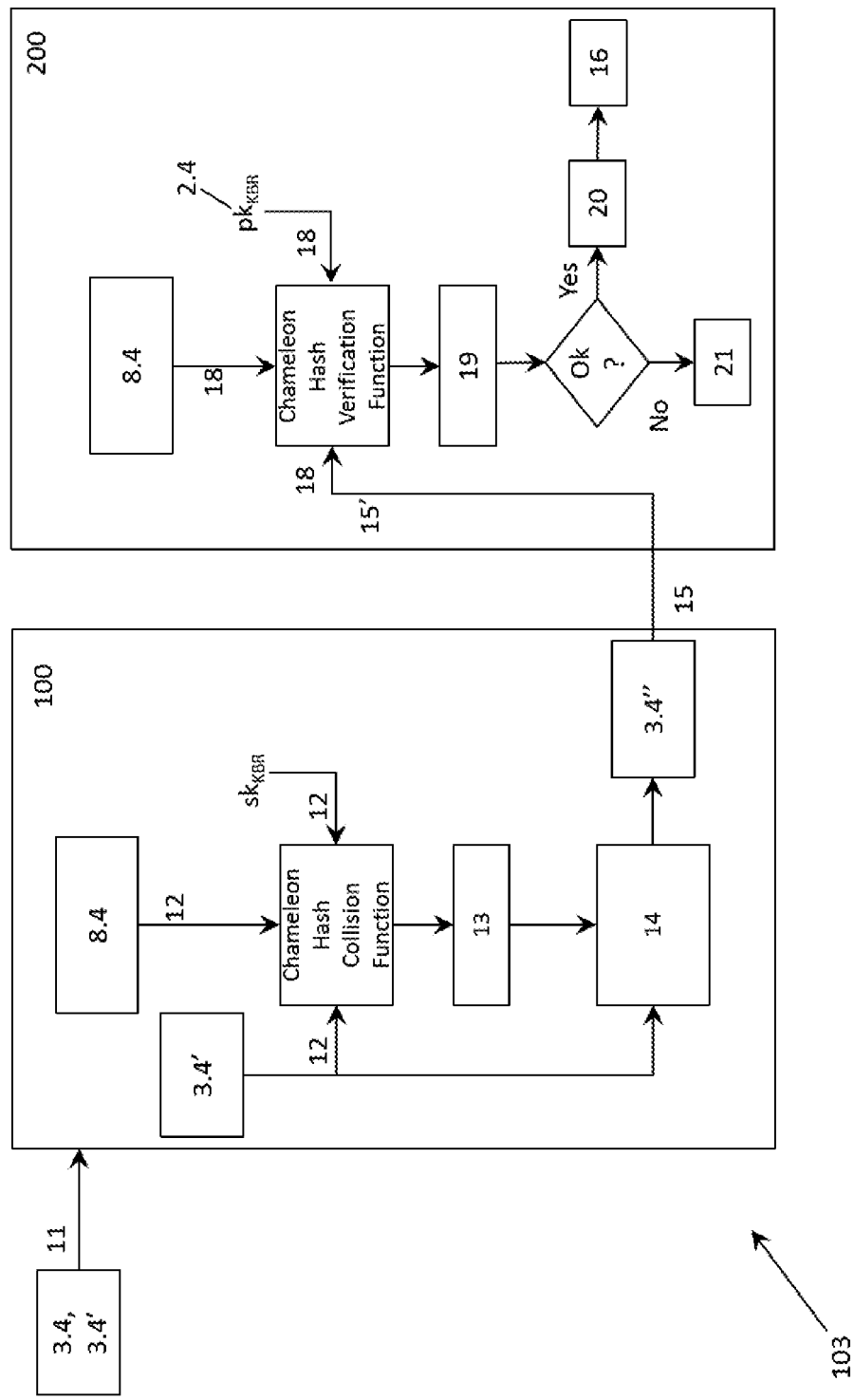
FIG. 5 This figure shows an embodiment computer-implemented method for secure updating of at least one secure updated kernel module of an electronic device wherein the secured updated kernel module is verified.

In FIG. 5 it is described an embodiment for verifying (103) a secured updated kernel module (3.4") performed in the electronic device (200) during the updating of said secured updated kernel module (3.4"). In this embodiment the secured updated kernel module (3.4") to be verified corresponds to the keyboard.

In particular, FIG. 5 describes the embodiment (103) wherein in the first step, the secured updated keyboard kernel module (3.4") is sent (15) by the computer (100) which has provided the secured updated keyboard kernel module (3.4") using the embodiment described in FIG. 1. After sending (15), the secured updated keyboard kernel module (3.4") is received (15') by the electronic device (200) completing the steps a) and b) of the method.

Once the secured updated keyboard kernel module (3.4") is received (15'), the electronic device inserts (18) secured updated kernel module (3.4"), the corresponding kernel module public key (2.4) and the chameleon hash (8.4) of the kernel module (3.4) in a chameleon hash verification function thereby obtaining a test hash (19). If the test hash (19) is different from the chameleon hash (8.4) of the kernel module (3.4), the electronic device (200) notifies to the operating system of the electronic device (200) that the secure updating a kernel module is invalid and deletes (21) the invalid kernel module. Otherwise, the electronic device (200) notifies (20) to the operating system of the electronic device (200) that the secure updating a kernel module is valid and the method continues in step c) of installing (16) the verified and secured updated kernel module (3.4").

Second Embodiment: Calculation of the Kernel Module Root Hash (2.5) (FIGS. 6a to 6d)

In this embodiment, the method is further configured to compute the kernel module root hash (2.5) as it is described in FIGS. 6a to 6d. In said figures, it is shown the structure of the Merkle tree (10). In this embodiment, as the electronic device comprises four kernel modules (3.1, 3.2, 3.3, 3.4), the Merkle tree (10) comprises a first level where the four kernel modules (3.1, 3.2, 3.3, 3.4) are hashed using four chameleon hash functions (ChamHash) which are similar between them and in the upper levels the results (8.1, 8.2, 8.3, 8.4, 9.1, 9.2) are hashed using similar hash functions of 256 bits (SHA256) in pairs until obtain one hash which is the kernel module root hash (2.5) or the root hash of a Merkle tree (10). In other embodiments, it can be used other types hash functions to build the Merkle tree, for example, any other variants of the hash functions SHA-2.

Figure 6A:
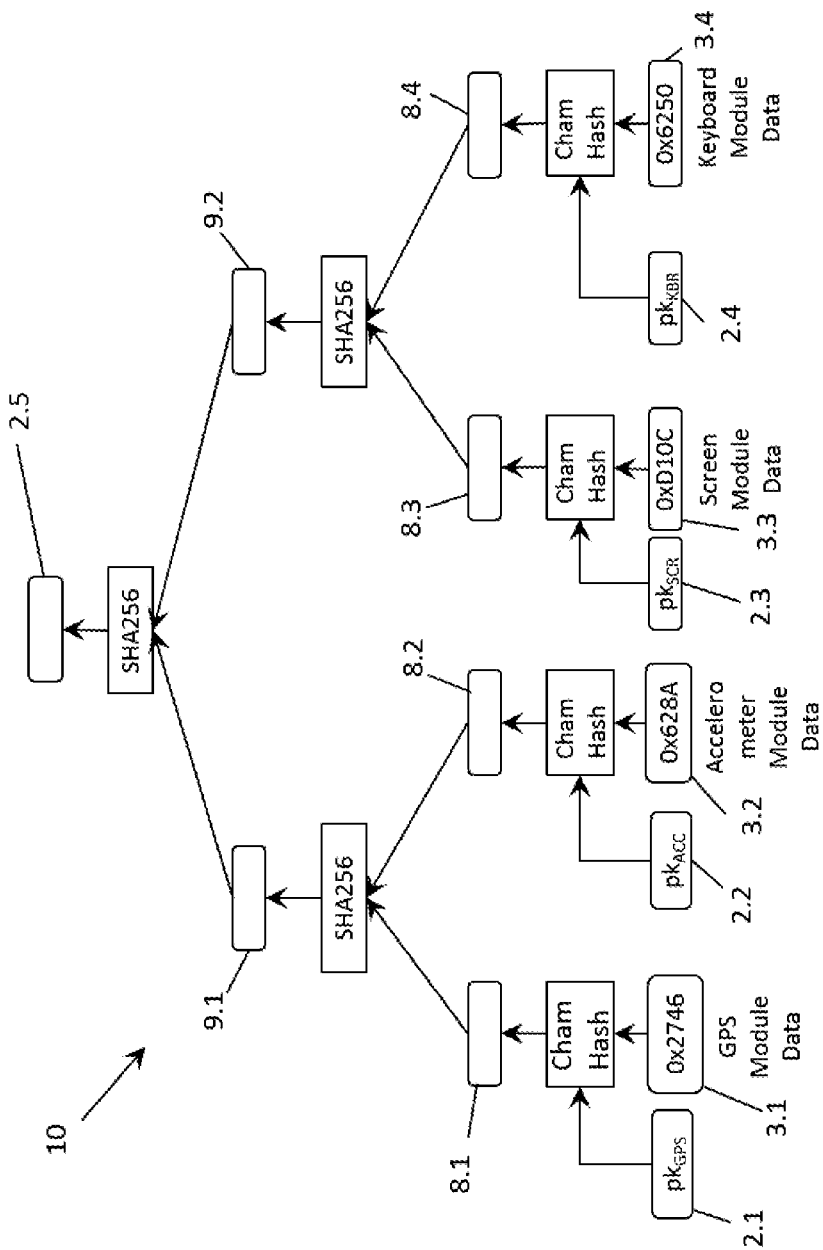
FIGS. 6a to 6d These figures show an embodiment of the generation of Chameleon Merkle Tree.

FIG. 6a shows the first step of the computation of the kernel module root hash (2.5). In particular, it is inserted in each chameleon hash function (ChamHash) a kernel module (3.1, 3.2, 3.3, 3.4) and its correspondent kernel module public key (2.1, 2.2, 2.3, 2.4). In this embodiment the hexadecimal values of the kernel modules are 0x2746 for the GPS kernel module (3.1), 0x628A for the accelerometer kernel module (3.2), 0xD10C for the screen kernel module (3.3), and 0x6250 for the secure updated keyboard kernel module (3.4"). Even if the value of the keyboard kernel module was 0x8D2C, which corresponds to the first version of the of the keyboard kernel module (3.4), the kernel module root hash (2.5) will be the same due to the updated process of the embodiment of FIG. 1.

Figure 6B:
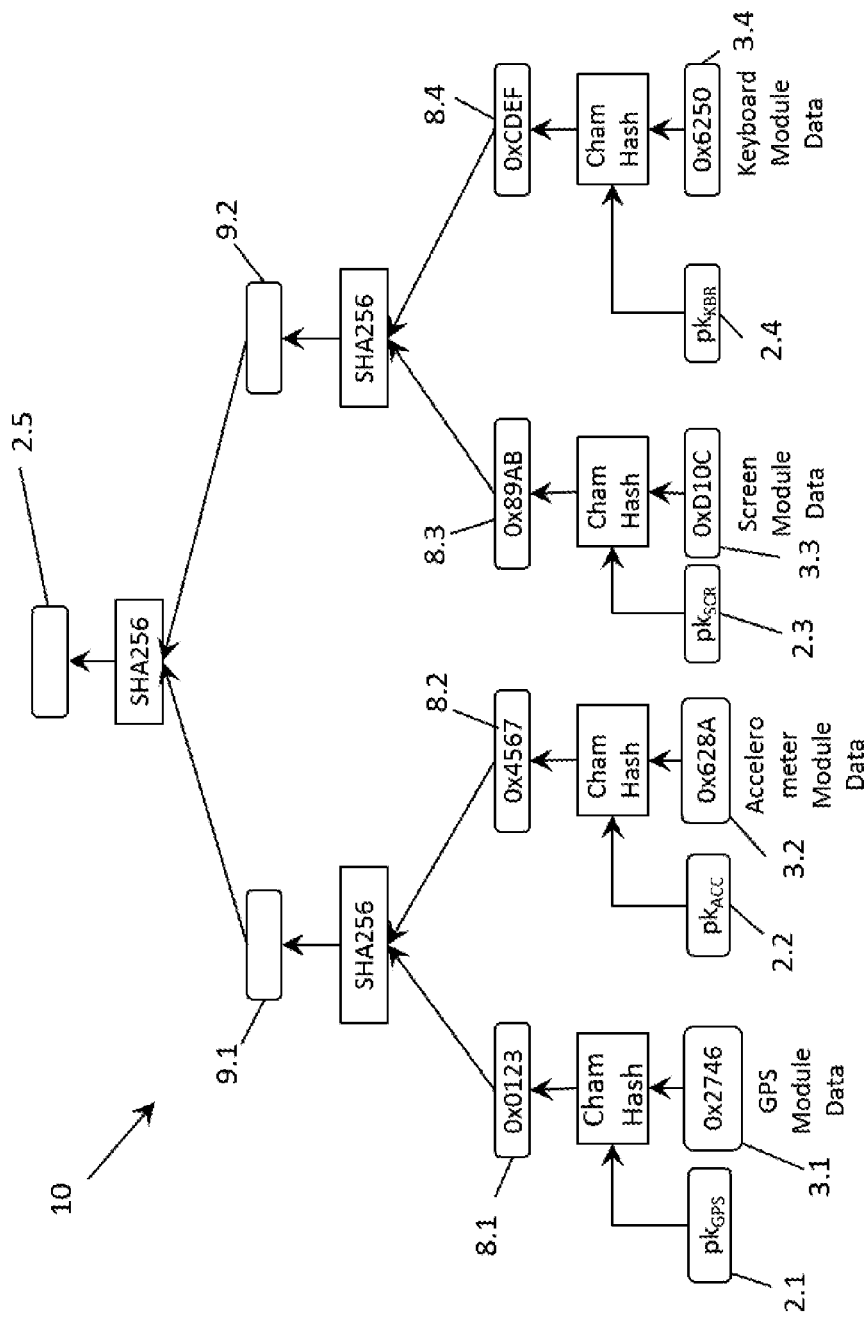

FIG. 6b shows the result of applying a chameleon hash function (ChamHash) to the hexadecimal values of kernel modules, obtaining the following hexadecimal values of the chameleon hashes (8.1, 8.2, 8.3, 8.4):

0x0123 for the chameleon hash (8.1) of the GPS kernel module (3.1),

0x4567 for the chameleon hash (8.2) of the accelerometer kernel module (3.2).

0x89AB for the chameleon hash (8.3) of the screen kernel module (3.3), and

0xCDEF for the chameleon hash (8.4) of the secure updated keyboard kernel module (3.4"). Even if the value of the keyboard kernel module was 0x8D2C, which corresponds to the first version of the of the keyboard kernel module (3.4), the value of the chameleon hash (8.4) will remain similar due to the secure updated process of the embodiment of FIG. 1.

Figure 6C:
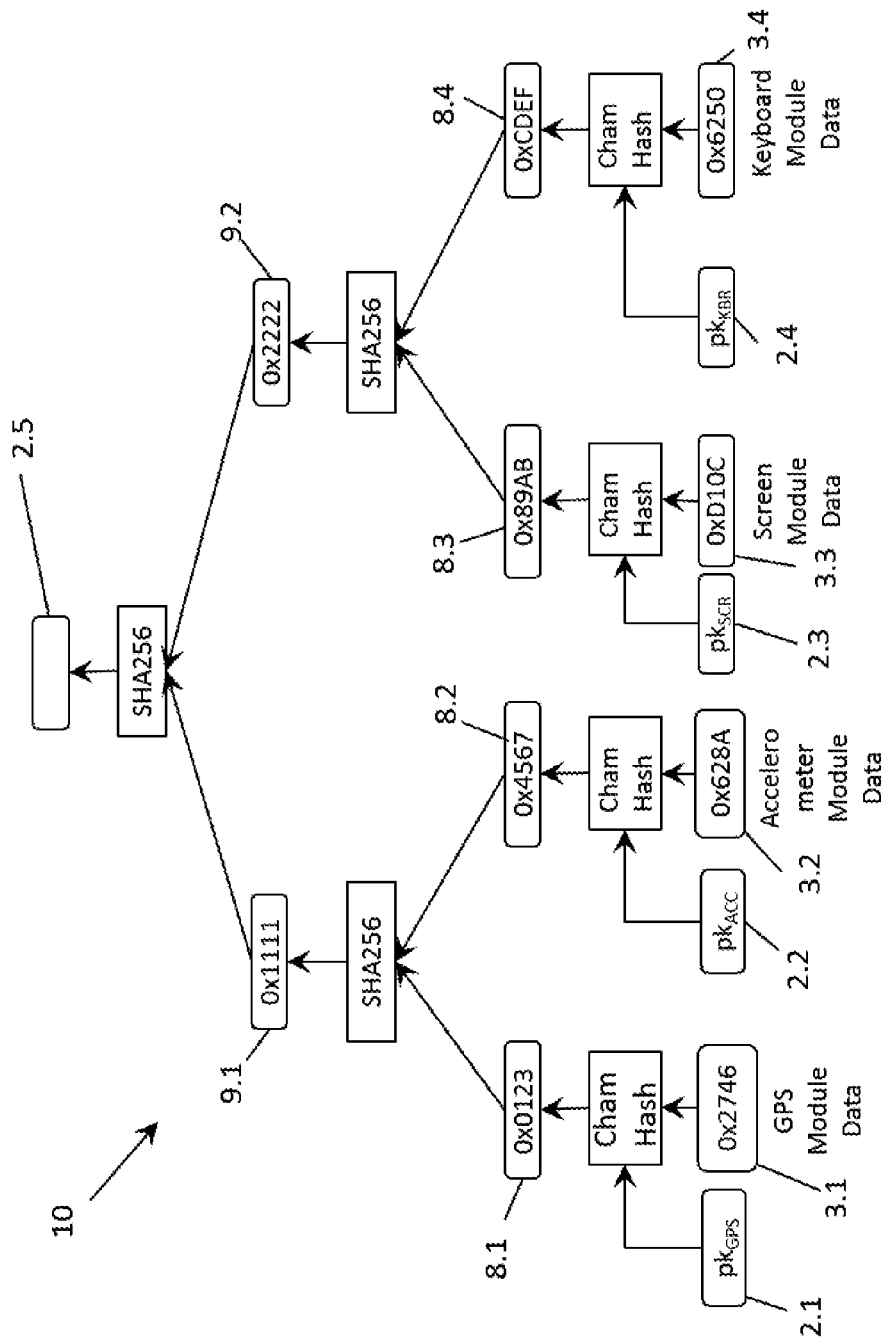

In FIG. 6c, it is shown the second step of the computation of the kernel module root hash (2.5), in particular, each obtained chameleon hash (8.1, 8.2, 8.3, 8.4) is hashed in pairs. In this embodiment, the chameleon hash (8.1) of the GPS kernel module (3.1) is hashed with the chameleon hash (8.2) of the accelerometer kernel module (3.2) and the chameleon hash (8.3) of the screen kernel module (3.3) is hashed with the chameleon hash (8.4) of the secure updated keyboard kernel module (3.4"). The hash function used is a hash function of 256 bits (SHA256) obtaining a first and a second hashes (9.1, 9.2) wherein their respective hexadecimal values are "0x1111" and "0x2222".

Figure 6D:
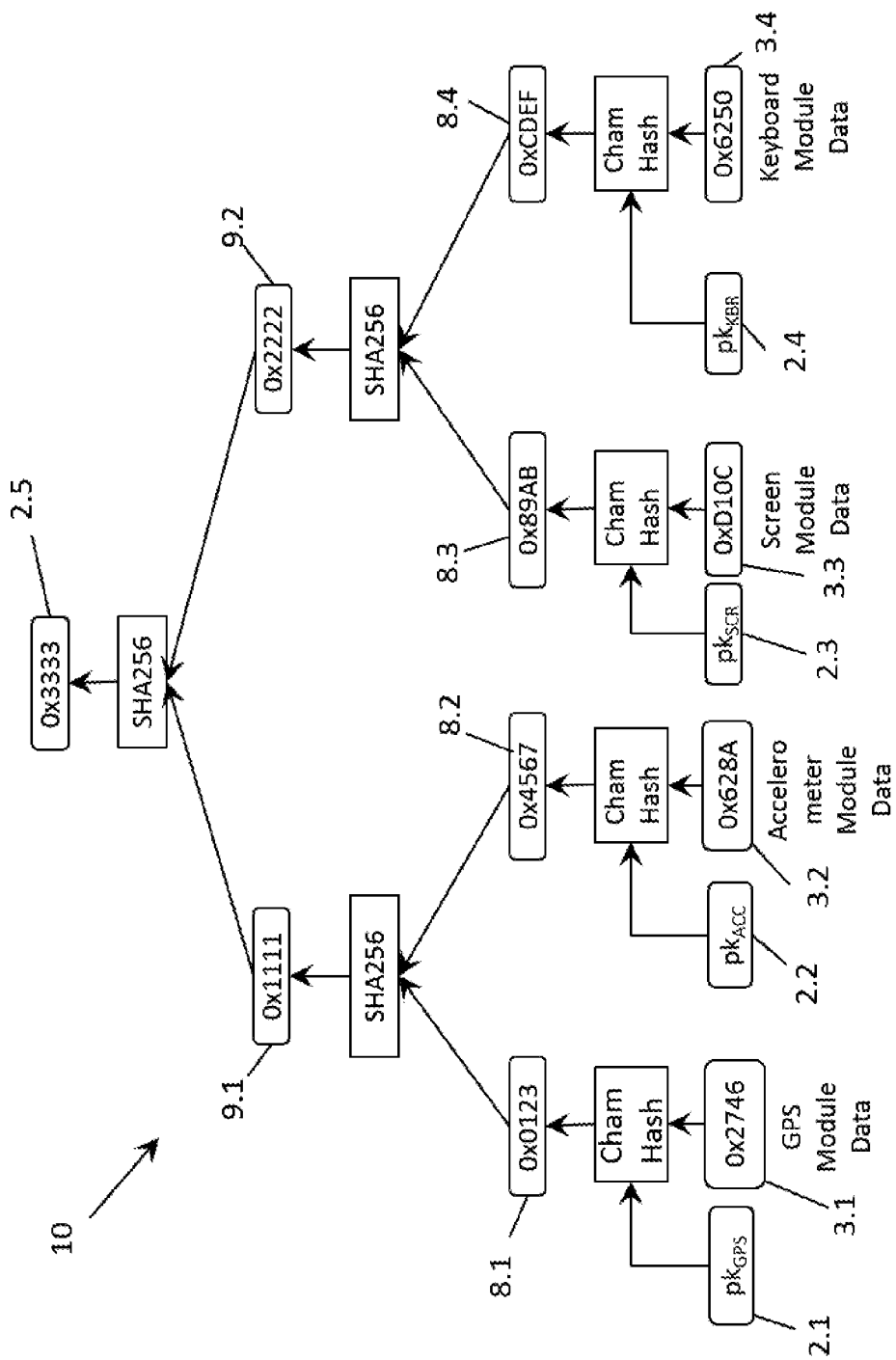

Finally as it is shown if FIG. 6d, the first and a second hashes (9.1, 9.2) are hashed obtaining the kernel module root hash (2.5) wherein the hexadecimal value of the kernel module root hash (2.5) is "0x3333". In this case, the hash function used is the same hash function of 256 bits (SHA256).

In the case of there is an odd number of hashes or chameleon hashes, the hashes or chameleon hashes are hashed in pairs and the remainder hash will be hashed in a next step until the number of hashes is one, which in that case it is the kernel module root hash (2.5).

Calculating Chameleon Hash, Collision Data (13) and Test Hash (19) in an AM04 Chameleon Hash System The calculation of a chameleon hash, the collision data (13) and the test hash (19) depends on the type of chameleon hash function (chameleonHash) used. In some embodiments, it may be used the chameleon hash described in the document of Giuseppe Ateniese, Breno de Medeiros: On the Key Exposure Problem in Chameleon Hashes. IACR Cryptology ePrint Archive 2004: 243 (2004). In the following paragraphs, it is described an embodiment of the calculation chameleon hash, collision data (13) and test hash (19) in an AM04 chameleon hash system.

Calculation of a Chameleon Hash

In this example, the inputs of the chameleon hash function (chameleonHash) are the screen kernel module public key (2.3, $pk_{scr}$) and the screen kernel module (3.3) to be hashed. Regarding the outputs obtained by chameleon hash function (chameleonHash), they will be the chameleon hash (8.3) of the screen kernel module (3.3), ch, and a data structure, "aux". "aux" comprises additional auxiliary information that will be used to verify the chameleon hash (and updated when a collision is found), in particular aux comprises:

aux.r: A random number.

aux.s: A random number.

In this example, the screen kernel module public key (2.3, $pk_{scr}$) is a data structure comprising:

pk.y: a number.

pk.g: a number.

pk.q: a prime number.

pk.p: a prime number.

Thus, the chameleon hash is computed as follows:

Generate aux.r: Random number between 0 and pk.q minus 1.

Generate aux.s: Random number in between 0 and pk.q minus 1.

Compute the chameleon hash (8.3), "ch", of the of the screen kernel module (3.4), ch, using the following chameleon hash function (chameleon Hash):

$$ch = r - (pk.y^{hash(data\|aux.r)} * pk.g^{aux.s} \bmod pk.p)$$

mod pk.q, wherein:

"data" are the kernel module, in this example, the screen kernel module (3.3),

"data∥r" is: data concatenated with r, and mod is the modulo operation which finds the remainder after division of one number by another.

Calculation of Collision Data (13)

Following the example of the calculation of a chameleon hash, the collision data (13) is calculated using a chameleon hash collision function, wherein its inputs are:
- sk: The private key corresponding to the public key that was used to compute the chameleon hash, in this case the screen kernel module private key.
- ch: The chameleon hash of the chameleon hash (8.3) of the screen kernel module (3.3).
- data': The "new" data for which a collision with respect to "ch" will be found, in this case the updated kernel module of the screen kernel module (3.3).

The output of the chameleon hash collision function is collision data (13) or aux'. aux' is an alternative auxiliary data structure that makes "ch" be a valid chameleon hash for data' comprising:
- aux'.r: A random number different than aux.r.
- aux'.s: A random number different than aux.s.

Thus, the collision data (13) is computed as follows:
Generate a random number, k, between 1 and pk.q minus 1
Compute the collision data (13), aux'.r, aux'.s, using the following chameleon hash collision function:
aux'.r=ch+(pk.$g^k$ mod pk.p) mod pk.q
aux'.s=k−hash(data'∥r) sk mod pk.q Thus, once data' and aux' is combined it is obtained a secured updated kernel module for the screen kernel module (3.3).

Calculation of Test Hash (19)

The test hash (19) is calculated using a chameleon hash verification function, wherein its inputs are:
- pk: The public key used to issue the chameleon hash, in this example the screen kernel module public key (2.3, $pk_{scr}$).
- ch: The chameleon hash of the chameleon hash (8.3) of the screen kernel module (3.3).
- The secured updated kernel module for the screen kernel module (3.3) which comprises:
  - d: The data to verify, in this example, data', i.e., the updated kernel module of the screen kernel module (3.3).
  - auxiliary: An instance of auxiliary data associated to the collision data (13), in this example, aux'.

The test hash (19) is computed the chameleon hash verification function as follows:

$$\text{test hash} = \text{auxiliary}.r - (pk.y^{hash(d\|auxiliary.r)} pk.g^{auxiliary.s} \mod pk.p)$$

mod pk.q wherein, auxiliary.r is aux'.r and auxiliary.s is aux'.s, d is data'.

Finally, if test hash (19) is equal than the chameleon hash (8.3), ch, means that the chameleon hash of secured updated kernel module for the screen kernel module (3.3), i.e., test hash obtained from data' and aux', is the same than the chameleon hash (8.3) of the screen kernel module (3.3), ch, therefore the chameleon hash of secured updated kernel module for the screen kernel module (3.3) is valid, and as consequence, the new version of the updated kernel module of the screen kernel module (3.3) can be installed. Likewise, if test hash (19) is different than the chameleon hash (8.3), ch, the chameleon hash of secured updated kernel module for the screen kernel module (3.3) is invalid.

The invention claimed is:

1. A computer-implemented method for secure updating at least one secured updated kernel module of an electronic device avoiding the intervention of the kernel developer, wherein the electronic device comprises an operating system and an authenticated kernel structure, the authenticated kernel structure comprising:
   kernel metadata comprising:
      at least one kernel module public key of at least one kernel module, wherein each kernel module public key corresponds to a kernel module private key, being the corresponding kernel module public and private keys of a kernel module pair of keys, and
      a kernel module root hash comprising a root hash of a Merkle tree,
   kernel data comprising:
      kernel body data, and
      at least one kernel module, wherein a kernel module is associated to one kernel module pair of keys,
   kernel metadata signature, and
   kernel body data signature,
wherein the method comprises:
   providing by a computer a secured updated kernel module generated according to the following computer-implemented method:
      inserting by a computer a chameleon hash of a kernel module, a kernel module private key of the kernel module and an updated kernel module of the kernel module in a chameleon hash collision function thereby obtaining a collision data, wherein the chameleon hash is a leaf node of the Merkle tree and the collision data is such that when the collision data is combined with the updated kernel module and said combination is hashed using a chameleon hash function, the result is equal to the chameleon hash of the kernel module,
      combining by the computer, the updated kernel module with the collision data obtaining thereby a secured updated kernel module,
   sending by the computer the secured updated kernel module to the electronic device by:
      inserting exclusively internally by the electronic device, without performing any communication outside said electronic device, the secured updated kernel module, the corresponding kernel module public key and the chameleon hash of the kernel module in a chameleon hash verification function thereby obtaining a test hash,
      if the test hash is different from the chameleon hash of the kernel module, notifying to the operating system of the electronic device that the secure updating of the kernel module is invalid,
      if the test hash is equal to the chameleon hash of the kernel module, notifying to the operating system of the electronic device that the secure updating of the kernel module is valid, and
   installing exclusively internally by the electronic device, without performing any communication outside said electronic device, the secured updated kernel module in the kernel data updating the kernel module.

2. The computer-implemented method according to claim 1 wherein the chameleon hash collision function comprises a key-exposure free chameleon hash function.

3. The computer-implemented method according to claim 1, wherein the computer comprises one kernel module pair of keys.

4. The computer-implemented method according to claim 1 wherein before providing by the computer the secured updated kernel module, the method further comprises:
   generating by the computer at least one kernel module pair of keys, sending by the computer the at least one kernel module public key to the electronic device,
sending by the computer the at least one kernel module private key to at least one external entity,
receiving and storing by the at least one external entity, the at least one kernel module private key, and
receiving and storing by the electronic device, the at least one kernel module public key.

5. The computer-implemented method according to claim 1, wherein before providing by the computer the secured updated kernel module, the method further comprises:
generating by an external entity at least one kernel module pair of keys,
sending by the external entity the at least one kernel module public key to the electronic device,
sending by the external entity the at least one kernel module private key to the computer,
receiving and storing by the computer, the at least one kernel module public key, and
receiving and storing by the computer, the at least one kernel module private key.

6. The computer-implemented method according to claim 1, wherein sending by the computer the secured updated kernel module to the electronic device is performed through a telecommunication network, and wherein any sending is ciphered, preferably using transport layer security.

7. The computer-implemented method according to claim 1, wherein the kernel module root hash is computed in the electronic device by:
inserting each kernel module and its correspondent kernel module public key in the chameleon hash function obtaining chameleon hash for each kernel module,
hashing each obtained chameleon hashes in pairs obtaining a hash for each hashing, and
hashing the hashes in pairs until obtaining the kernel module root hash.

8. The computer-implemented method according to claim 1, wherein if the test hash is different from the chameleon hash of the kernel module, the method further comprises deleting the secured updated kernel module.

9. A system for secure updating at least one kernel module comprising:
a server and an electronic device in communication to the server through a telecommunications network, the server and the electronic device configured to perform a computer-implemented method for secure updating at least one secured updated kernel module of an electronic device avoiding the intervention of the kernel developer, wherein the electronic device comprises an operating system and an authenticated kernel structure, the authenticated kernel structure comprising:
kernel metadata comprising:
at least one kernel module public key of at least one kernel module, wherein each kernel module public key corresponds to a kernel module private key, being the corresponding kernel module public and private keys of a kernel module pair of keys, and
a kernel module root hash comprising a root hash of a Merkle tree,
kernel data comprising:
kernel body data, and
at least one kernel module, wherein a kernel module is associated to one kernel module pair of keys,
kernel metadata signature, and
kernel body data signature,
wherein the method comprises:
providing by a computer a secured updated kernel module generated according to the following computer-implemented method:
inserting by a computer a chameleon hash of a kernel module, a kernel module private key of the kernel module and an updated kernel module of the kernel module in a chameleon hash collision function thereby obtaining a collision data, wherein the chameleon hash is a leaf node of the Merkle tree and the collision data is such that when the collision data is combined with the updated kernel module and said combination is hashed using a chameleon hash function, the result is equal to the chameleon hash of the kernel module,
combining by the computer, the updated kernel module with the collision data obtaining thereby a secured updated kernel module,
sending by the computer the secured updated kernel module to the electronic device by:
inserting exclusively internally by the electronic device, without performing any communication outside said electronic device, the secured updated kernel module, the corresponding kernel module public key and the chameleon hash of the kernel module in a chameleon hash verification function thereby obtaining a test hash,
if the test hash is different from the chameleon hash of the kernel module, notifying to the operating system of the electronic device that the secure updating of the kernel module is invalid,
if the test hash is equal to the chameleon hash of the kernel module, notifying to the operating system of the electronic device that the secure updating of the kernel module is valid, and
installing exclusively internally by the electronic device, without performing any communication outside said electronic device, the secured updated kernel module in the kernel data updating the kernel module.

10. A non-transitory computer-readable medium storing a computer program for secure updating at least one kernel module of an electronic device, comprising instructions which, when executed by a computer and an electronic device, cause the computer and the electronic device to carry out a computer-implemented method for secure updating at least one secured updated kernel module of an electronic device avoiding the intervention of the kernel developer, wherein the electronic device comprises an operating system and an authenticated kernel structure, the authenticated kernel structure comprising:
kernel metadata comprising:
at least one kernel module public key of at least one kernel module, wherein each kernel module public key corresponds to a kernel module private key, being the corresponding kernel module public and private keys of a kernel module pair of keys, and
a kernel module root hash comprising a root hash of a Merkle tree,
kernel data comprising:
kernel body data, and
at least one kernel module, wherein a kernel module is associated to one kernel module pair of keys,
kernel metadata signature, and
kernel body data signature, wherein the method comprises:
  providing by a computer a secured updated kernel module generated according to the following computer-implemented method:
    inserting by a computer a chameleon hash of a kernel module, a kernel module private key of the kernel module and an updated kernel module of the kernel module in a chameleon hash collision function thereby obtaining a collision data, wherein the chameleon hash is a leaf node of the Merkle tree and the collision data is such that when the collision data is combined with the updated kernel module and said combination is hashed using a chameleon hash function, the result is equal to the chameleon hash of the kernel module,
    combining by the computer, the updated kernel module with the collision data obtaining thereby a secured updated kernel module, sending by the computer the secured updated kernel module to the electronic device by:
    inserting exclusively internally by the electronic device, without performing any communication outside said electronic device, the secured updated kernel module, the corresponding kernel module public key and the chameleon hash of the kernel module in a chameleon hash verification function thereby obtaining a test hash,
    if the test hash is different from the chameleon hash of the kernel module, notifying to the operating system of the electronic device that the secure updating of the kernel module is invalid,
    if the test hash is equal to the chameleon hash of the kernel module, notifying to the operating system of the electronic device that the secure updating of the kernel module is valid, and
  installing exclusively internally by the electronic device, without performing any communication outside said electronic device, the secured updated kernel module in the kernel data updating the kernel module.

11. A non-transitory computer-readable medium, comprising instructions which, when executed by a computer and an electronic device, cause the computer and the electronic device to carry out a computer-implemented method for secure updating at least one secured updated kernel module of an electronic device avoiding the intervention of the kernel developer, wherein the electronic device comprises an operating system and an authenticated kernel structure, the authenticated kernel structure comprising:
  kernel metadata comprising:
    at least one kernel module public key of at least one kernel module, wherein each kernel module public key corresponds to a kernel module private key, being the corresponding kernel module public and private keys of a kernel module pair of keys, and
    a kernel module root hash comprising a root hash of a Merkle tree,
  kernel data comprising:
    kernel body data, and
    at least one kernel module, wherein a kernel module is associated to one kernel module pair of keys,
  kernel metadata signature, and
  kernel body data signature,
wherein the method comprises:
  providing by a computer a secured updated kernel module generated according to the following computer-implemented method:
    inserting by a computer a chameleon hash of a kernel module, a kernel module private key of the kernel module and an updated kernel module of the kernel module in a chameleon hash collision function thereby obtaining a collision data, wherein the chameleon hash is a leaf node of the Merkle tree and the collision data is such that when the collision data is combined with the updated kernel module and said combination is hashed using a chameleon hash function, the result is equal to the chameleon hash of the kernel module,
    combining by the computer, the updated kernel module with the collision data obtaining thereby a secured updated kernel module,
  sending by the computer the secured updated kernel module to the electronic device by:
    inserting exclusively internally by the electronic device, without performing any communication outside said electronic device, the secured updated kernel module, the corresponding kernel module public key and the chameleon hash of the kernel module in a chameleon hash verification function thereby obtaining a test hash,
    if the test hash is different from the chameleon hash of the kernel module, notifying to the operating system of the electronic device that the secure updating of the kernel module is invalid,
    if the test hash is equal to the chameleon hash of the kernel module, notifying to the operating system of the electronic device that the secure updating of the kernel module is valid, and
  installing exclusively internally by the electronic device, without performing any communication outside said electronic device, the secured updated kernel module in the kernel data updating the kernel module.

* * * * *